US011577177B2

(12) United States Patent
Guertin

(10) Patent No.: US 11,577,177 B2
(45) Date of Patent: Feb. 14, 2023

(54) MOTORIZED ROTATABLE TREADMILL AND SYSTEM FOR CREATING THE ILLUSION OF MOVEMENT

(71) Applicant: Matthew Guertin, Minnetonka, MN (US)

(72) Inventor: Matthew Guertin, Minnetonka, MN (US)

(73) Assignee: INFINISET, INC., Edina, MN (US)

( * ) Notice: Subject to any disclaimer, the term of this patent is extended or adjusted under 35 U.S.C. 154(b) by 0 days.

(21) Appl. No.: 17/698,420

(22) Filed: Mar. 18, 2022

(65) Prior Publication Data

US 2022/0297024 A1 Sep. 22, 2022

Related U.S. Application Data

(60) Provisional application No. 63/163,135, filed on Mar. 19, 2021.

(51) Int. Cl.
*A63G 31/16* (2006.01)
*A63J 5/02* (2006.01)
*A63J 1/00* (2006.01)

(52) U.S. Cl.
CPC .. *A63J 5/02* (2013.01); *A63J 1/00* (2013.01)

(58) Field of Classification Search
CPC ........... A63G 31/16; H04N 5/262; A61B 6/04
USPC .......... 472/60, 61, 130; 482/66, 68
See application file for complete search history.

(56) References Cited

U.S. PATENT DOCUMENTS

| 2015/0150522 | A1 | 6/2015 | Papaioannou |
| 2017/0129105 | A1 | 5/2017 | Stephens, Jr. |
| 2018/0053349 | A1* | 2/2018 | Chen ..................... G06T 19/006 |
| 2019/0086996 | A1 | 3/2019 | Bahrami et al. |
| 2019/0307982 | A1 | 10/2019 | Brodsky |

FOREIGN PATENT DOCUMENTS

| CN | 104740829 A | 7/2015 |
| CN | 105396261 A | 3/2016 |
| CN | 206026963 U | 3/2017 |

(Continued)

OTHER PUBLICATIONS

International Search Report and Written Opinion issued for PCT/US2022/020919, dated Jun. 24, 2022.

(Continued)

*Primary Examiner* — Kien T Nguyen
(74) *Attorney, Agent, or Firm* — Westman, Champlin & Koehler, P.A.; Amanda M. Prose

(57) ABSTRACT

A motorized, rotatable treadmill and a system for creating the illusion of user movement while the user is stationary with respect to an environment as the user walks or otherwise moves on an endless track of the treadmill. The user can then travel an unlimited distance in unlimited directions while remaining stationary in physical location. The speed of the treadmill is precisely controlled and/or precisely matched with movement of a camera and a real-world speed of movement of the user and the distance the user travels on the belt to create the illusion of movement of the person being filmed. When the treadmill is provided within an LED virtual film set or green screen set, background imagery is added to further supplement the movement in a selected environment.

6 Claims, 18 Drawing Sheets

(56) References Cited

FOREIGN PATENT DOCUMENTS

| CN | 206209595 U | 5/2017 |
|---|---|---|
| CN | 105879305 B | 2/2018 |
| CN | 108211220 A | 6/2018 |
| CN | 108379781 A | 8/2018 |
| CN | 208641720 U | 3/2019 |
| CN | 109876370 A | 6/2019 |
| CN | 110124276 A | 8/2019 |
| CN | 110180128 A | 8/2019 |
| CN | 209933935 U | 1/2020 |
| CN | 110755807 A | 2/2020 |
| CN | 108114405 B | 3/2020 |
| JP | 2000516829 A | 12/2000 |
| KR | 10-1571361 B1 | 11/2015 |
| KR | 10-2001966 B1 | 10/2019 |
| KR | 10-2020-0091594 A | 7/2020 |
| KR | 10-2021-0023190 A | 3/2021 |

OTHER PUBLICATIONS

PhotoRobot "PhotoRobot's Virtual_Catwalk—Introduction (short version)" YouTube <https://www.youtube.com/watch?v=4fcAN-GCmdc> 1:04, Uploaded Dec. 30, 2012, Accessed Nov. 8, 2022.
PhotoRobot "Walking belt video shooting—behind the scenes timelaps" YouTube <https://www.youtube.com/watch?v=6NaPPGVqx-I> 0:53, Uploaded Oct. 23, 2012, Accessed Nov. 8, 2022.
PhotoRobot "Digital Fashion Shows on the Virtual Catwalk from https://www.photorobot.com" YouTube <https://www.youtube.com/watch?v=_XXayllb_0o> 1:02, Uploaded Jan. 28, 2016, Accessed Nov. 8, 2022.

\* cited by examiner

MOTORIZED ROTATABLE TREADMILL AND SYSTEM FOR CREATING THE ILLUSION OF MOVEMENT

CROSS-REFERENCE TO RELATED APPLICATIONS

This application claims priority to and the benefit of U.S. provisional patent application Ser. No. 63/163,135, filed on Mar. 19, 2021, the contents of which are incorporated herein in its entirety.

BACKGROUND

Camera tracking systems are used with green screen backgrounds LED wall backgrounds to allow a person being filmed to appear as though they are in another environment, one that is generally created by CGI artists and is rendered in real-time by a rendering engine along with a media server. While the possibilities are unlimited with respect to the environment in which the person can be inserted, the person is otherwise very limited in how far and in what directions they are able to walk or run within this virtual environment.

Most "virtual film sets" currently use a camera tracking system that severely limits the movement of the person being filmed to a very small area in the center of the LED or green screen-based set. The person as well as the camera are always stuck in the same spot of the scene essentially and unable to travel. For a video-based environment to appear realistic in its position, it must remain static relative to that of the person. Even though the tracked film camera is able to move and view the environment from different perspectives, it is essentially static due to the fact that it must always view the person from the same frontal point of view with a very limited ability to orbit around them.

SUMMARY

An aspect of the present disclosure relates to a motorized treadmill that is mounted atop an infinitely rotating, motorized turntable. A speed and direction of the treadmill belt, as well as the turntable, is determined and controlled by a user, a non-user (remote) party, or based on a combination of three-dimensional, virtual, and real-world GPS positional and rotational data.

An aspect of the present disclosure relates to a motorized treadmill having a travel deck supporting a belt arranged in an endless loop; a turntable for rotating the travel deck; one or more sources of vibration for providing haptic feedback to one or more locations on the belt; and a floor base for supporting the travel deck, turntable, and one or more vibration sources.

The one or more vibration sources comprises adjustable vibration motors.

A phenolic resin sheet is provided below the belt, allowing the belt to slide thereacross as the belt is moved and wherein the vibration sources are secured to an underside of the sheet.

The treadmill is configured to provide a user a surface for movement in forward and reverse directions via the belt, and wherein the angular direction of the forward and reverse movement is selectively adjustable via rotation of the turntable for directionally unlimited movement in an X-Y plane. For example, the X-Y plane refers to the X-Y ground plane, or the ground plane with respect to a virtual environment.

With respect to the X-Y plane, additional movement may occur in a Z direction, via tilting of an orientation of the belt in the Z direction by a mechanism for raising and lowering one end of the belt.

The vibration sources are provided in a grid formation below the belt and in vibrational contact with the belt such that the vibration sources provide haptic feedback to a user on the treadmill. The vibration sources are in communication with a controller and wherein one or more vibration sources can be actuated to indicate initiation or ceasing of movement of the belt, initiation or ceasing of rotation of the turntable, a user's position on the belt, a cue or action related to the scene being filmed, or combinations thereof.

The turntable comprises a removable cover which provides a floor space to a user and one or more handles for removing the turntable from the floor base.

The floor base operably supports the turntable thereon and wherein the base comprises a plurality of roller wheels for centering and supporting the turntable thereon. The turntable operably supports the travel deck and wherein the turntable supports a motor for controlling operation of the belt. The floor base houses a motor, drive belt and roller and drive wheel assembly for operation of the turntable.

The floor base includes a slip ring which supplies power and data to the components contained within the turntable, such as the treadmill belt and/or vibration motors. The slip ring is configured to allow endless rotation of the turntable by eliminating cords or cables in the device that would otherwise limit turntable rotation.

The treadmill comprises one or more monochrome surfaces for use of the treadmill in a digital environment, where the monochrome surface allows for digital isolation of a user on the treadmill.

The monochrome surface is green, or any color which provides a background in front of which the moving user is filmed, and which allows a separately filmed background to be added to the final image.

The treadmill has dimensions sufficient to allow the treadmill to replace a section of LED flooring from a pre-existing LED floor tile system of an LED virtual film set.

The treadmill is configured for use in a standard green screen film studio.

Another aspect of the present disclosure relates to a system for creating the illusion of movement of a user. The user may be inserted into a virtually rendered setting, a live-action pre-filmed setting, or a combination thereof. The system includes a motorized treadmill assembly having an endless belt operably supported on a rotatable turntable such that the treadmill assembly allows for unlimited directional movement of the belt and a controller configured to synch the movement of the treadmill with a camera in real-time. The treadmill assembly is configured to support the user thereon and wherein the treadmill assembly remains stationary, and the user movement is confined to a surface area of the belt, and the illusion of unrestricted movement is created.

Wherein the camera and user rotate inversely to one another to achieve realistic orbital rotation.

The camera movement is synched with a real-world speed and distance traveled by the belt for creating the illusion of unrestricted movement of the user.

Yet another aspect of the present disclosure relates to a method of creating the illusion of movement. To create the illusion of movement in a virtual setting, the method includes providing an endless track on a rotatable turntable and a camera spaced apart from the turntable and wherein the camera is moveable around the turntable and/or rotatable about a vertical axis. The speed of the endless track is precisely controllable, and a direction of the endless track is also controllable by rotating the turntable.

The movement of the camera is then synched with a real-world speed of the endless track and a distance traveled by the track.

The synchronized rotation of the user and turntable relative to the present orientation of the camera is solved for using inverse kinematics.

One or more audio, visual, or tactile cue sources are provided to the endless track, rotatable turntable, user or a combination thereof and actuating one or more audio, visual, or tactile cue sources to provide a physical signal to the user on the endless track to indicate one or more of a position of the user on the track, an initiation or ceasing of movement of the track, an initiation or ceasing of rotation of the turntable, or a cue or action related to the scene being filmed.

The rotatable turntable is installable in an LED based virtual film set or green screen film set.

When creating the illusion of movement of the user on the treadmill, the method includes tracking the precise location of the user in real-time and providing physical cues to the user to direct the user's movement to maintain the user on a location of the endless belt. If the user deviates from the location on the endless belt, adjusting a location of the camera to compensate for the deviation.

DETAILED DESCRIPTION

Figure 2:
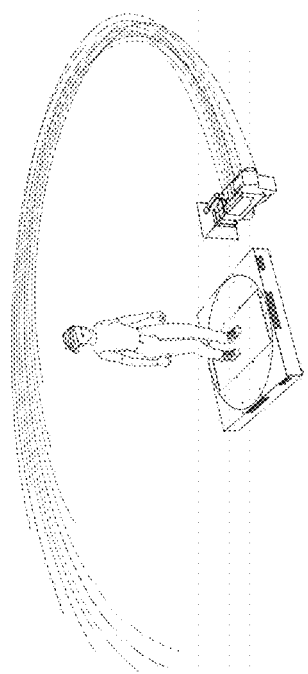
FIG. 2 is a front perspective view of the assembly with camera movement indicators for illustrating the creation of the illusion of movement in one embodiment.
Figure 1:
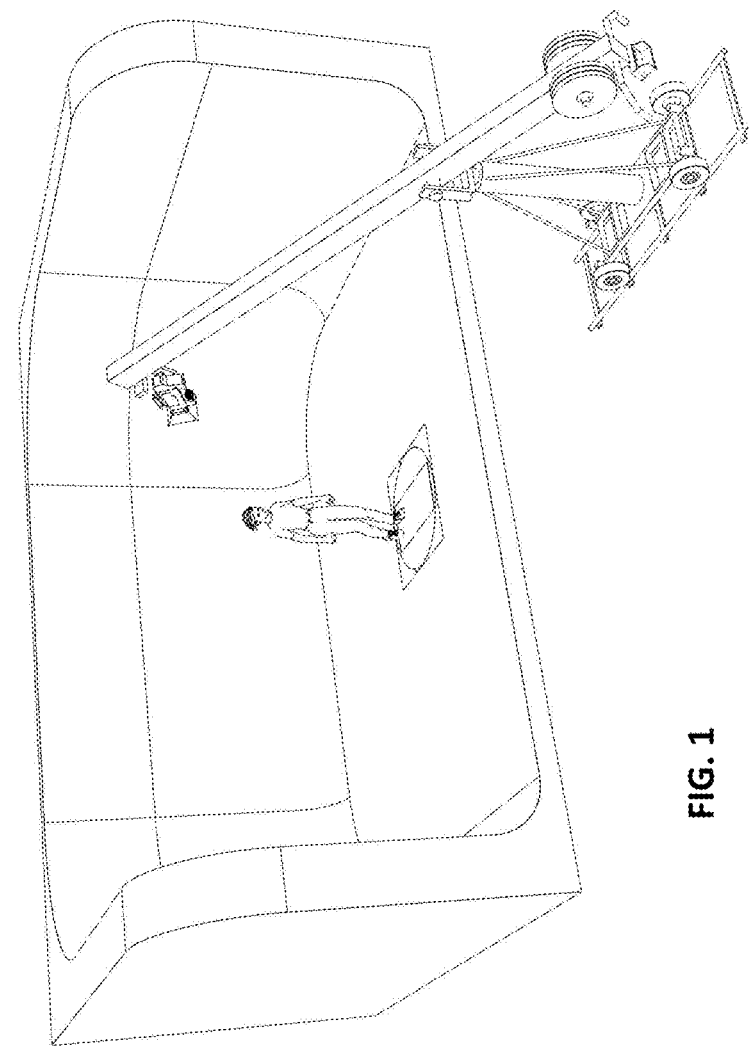
FIG. 1 is a front perspective view of a motorized rotatable treadmill assembly and system for generating the illusion of movement in one environment.
Figure 3:
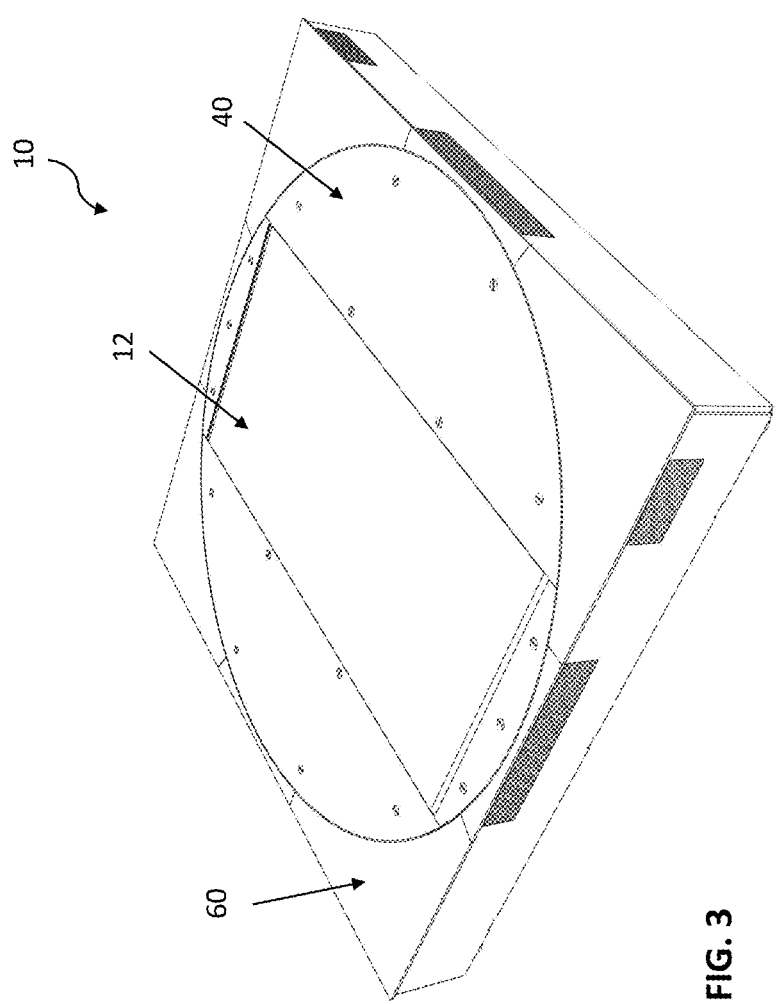
FIG. 3 is a top perspective view of the motorized rotatable treadmill assembly.
Figure 5:
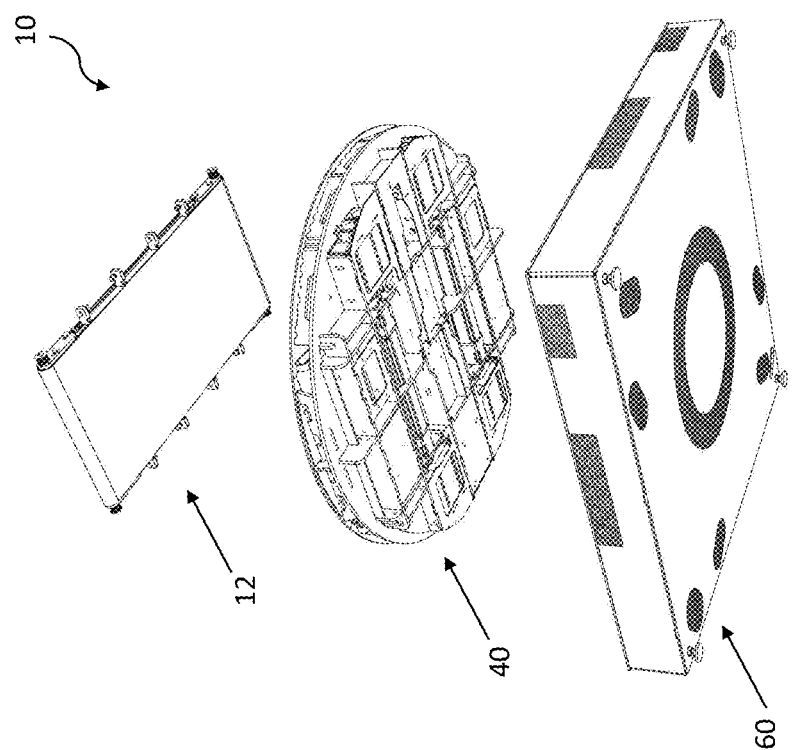
FIG. 5 is a bottom perspective exploded view of the assembly according to one or more embodiments herein.
Figure 4:
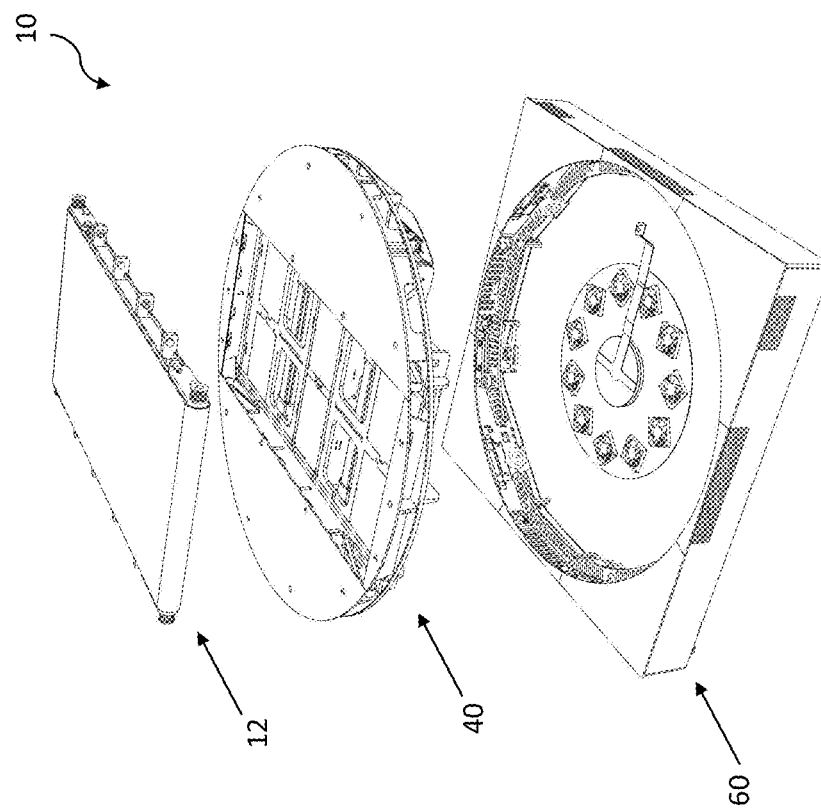
FIG. 4 is a top perspective exploded view of the assembly according to one or more embodiments herein.
Figure 7:
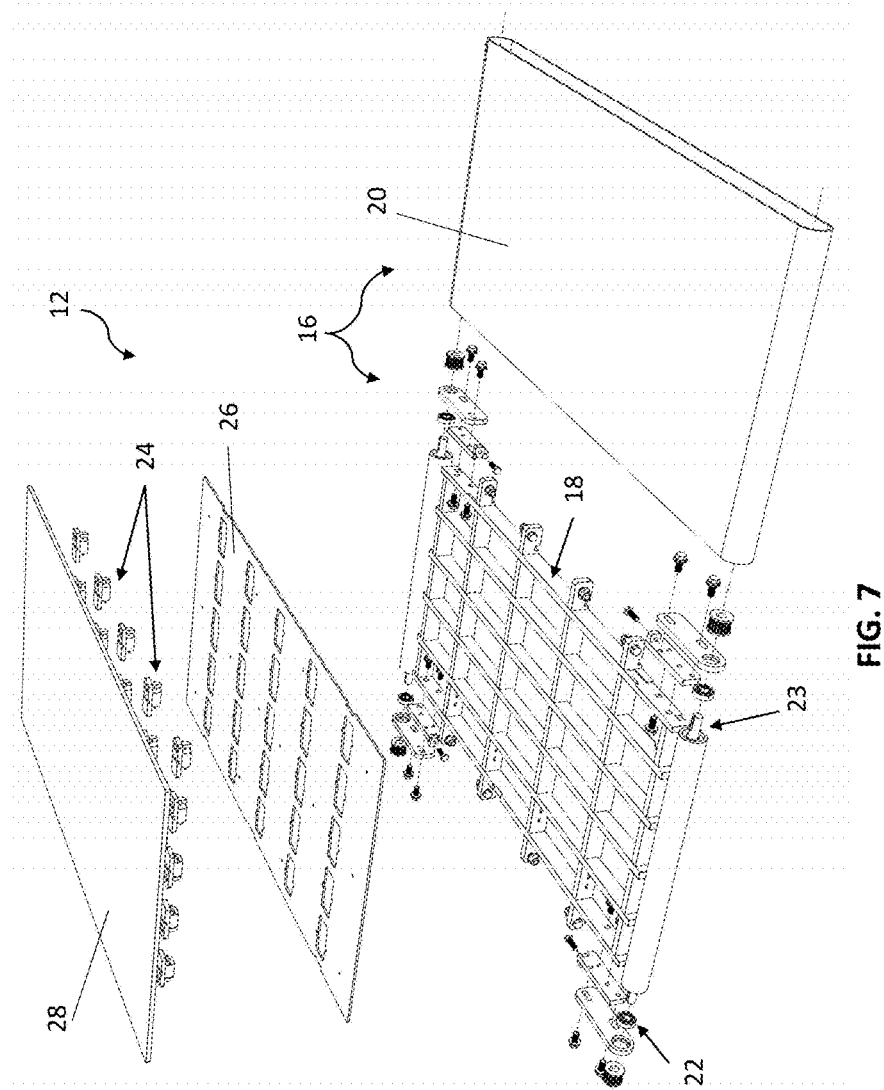
FIG. 7 is an exploded view of the travel deck.
Figure 6:
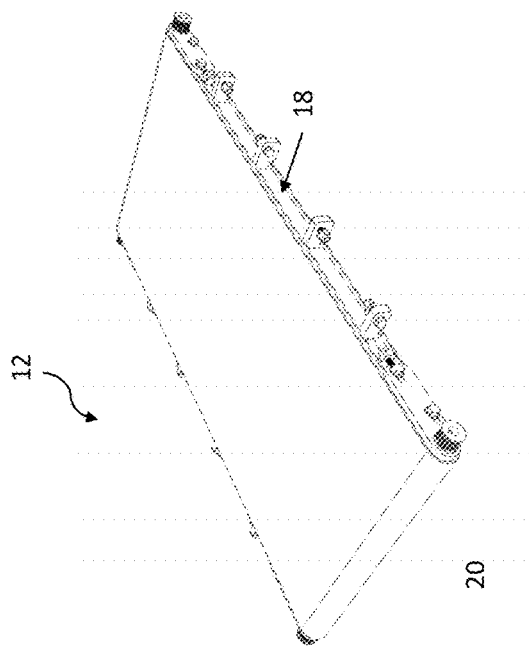
FIG. 6 is a perspective view of a travel deck of the motorized rotatable treadmill.
Figure 9:
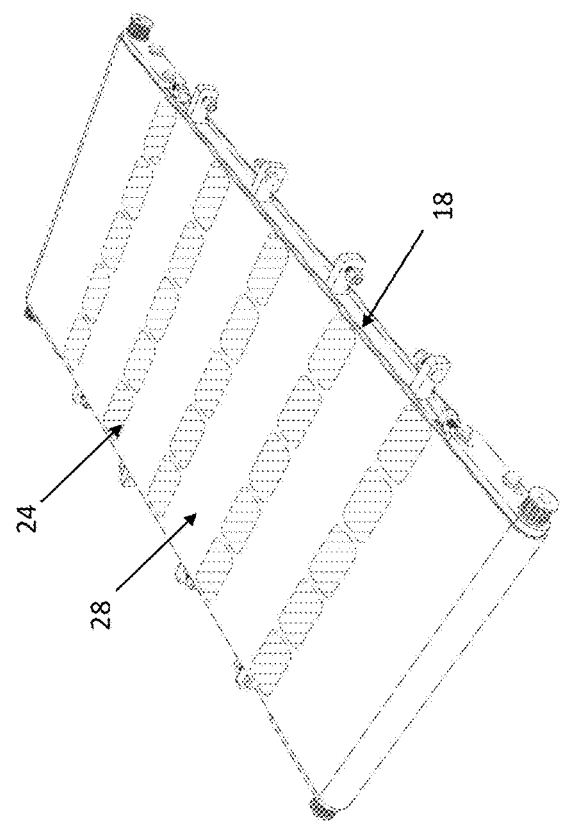
FIGS. 8, 9 and 10 illustrate a feedback system for the travel deck.
Figure 8:
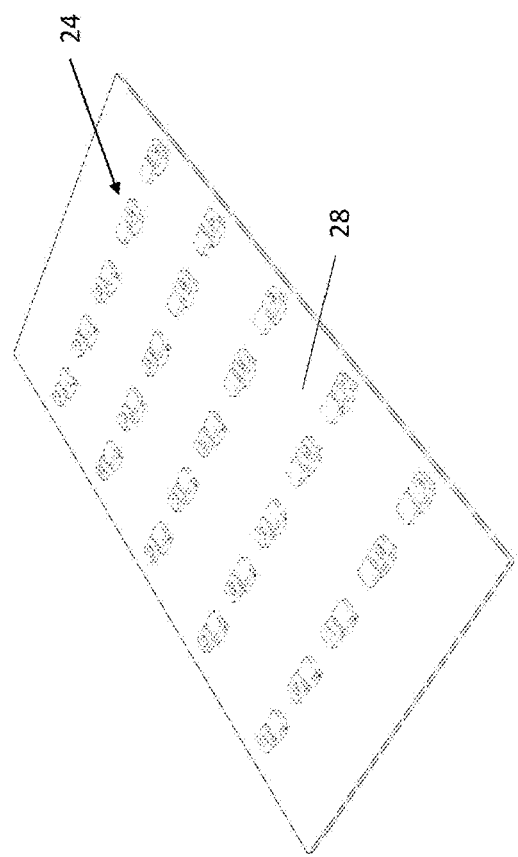

A motorized rotatable treadmill assembly for providing omnidirectional simulated movement for a user is described herein. The user can travel in any direction while using the motorized rotatable treadmill assembly while remaining stationary in a location. The motorized rotatable treadmill assembly can be used in various environments for entertainment purposes and/or for creating content including the illusion of a user traveling through an environment while never leaving the space in which the motorized rotatable treadmill is located.

In one or more embodiments, the motorized treadmill and rotating turntable are used in combination with a system for controlling the treadmill and turntable along and optionally with a camera for creating the illusion of movement of a user, for example, a person, inserted into a digital environment is described herein and illustrated in the figures.

A motorized rotatable treadmill assembly according to one or more embodiments described herein is a motorized treadmill belt on a travel deck that is mounted on an infinitely rotatable, and motorized turntable. In some embodiments, the speed and direction of the treadmill belt as well as the rotational speed and position of the turntable may be determined and controlled by data collected from a 3D/virtual system and/or real world/GPS positional and rotational data from cameras being used for recording and/or rendering a video-based environment in which a user of the treadmill is being virtually inserted into.

User control modes for the assembly may include, but are not limited to a fixed speed mode, a self-paced mode, and a remote user cuing mode. In a fixed speed mode, the motorized rotatable treadmill assembly operation is controlled directly by signals received from a media server or controller where the signals control various functions of the assembly such as starting, stopping, speed and rate of the treadmill and the rotation of the turntable, for example. The user then may match the speed of the treadmill.

In the self-paced mode, the user may be tracked, and data related to user movement communicated to the media server or controller. The user moves and the assembly responds directly to the user movement with movement of components of the assembly. That is, for example, the movement of the treadmill belt and/or turn turntable may respond and change with each step or change in position of the user. Tracking of the user may be carried out with various sensors integrated into the assembly, worn by the user, and/or surrounding the assembly. As the user moves, data from the sensors is processed and the media server or other controller adjusts operation of the assembly such as treadmill speed and travel deck rotation.

In the remote user cuing mode, the user may control one or more triggering cues via remote or wireless connection with the assembly, allowing the user the ability to progress through an ordered list of cues at a pace selected by the user. The cues may be programmed and arranged in a respective order prior to the user being filmed traveling through the environment when on the assembly.

In one or more of the embodiments described herein, the user cue system is configured to provide audio, visual, tactile and/or haptic cues to the user for anticipating an assembly start, stop, rotation, speed, speed change or other user and/or assembly action(s) that relate to the user movement, location on the belt, and/or corresponding digital environment.

The user may be provided with one or more wearable devices in communication with the media server. These devices comprise sensors for monitoring and recording user movement and for providing feedback relating to the user movements or positioning to the media server or controller. Additional wearable devices may be configured for providing audio, visual, tactile or other signals or cues to the user from the media server or other controller. For example, the wearable devices may comprise one or more inertial measurement sensors, haptic vibration motors for contacting the user's body, insoles, vibratory or LED components worn on various parts of the user's body among other various devices for communicating remotely and discreetly with the user. The user cue system may provide audio cues which may be wirelessly transmitted to an in ear listening device worn by the user.

In one or more embodiments, the assembly is configured for use with a digitally rendered environment. An animation timeline may be used with one or more cue modes as a system controller for the assembly. The animation timeline is configured to establish the user(s) travel path and/or a camera path through a virtual or pre-filmed environment that the user(s) is/are inserted into. The combination of the animation timeline and cue sequencing system provides the option for the different user control modes. In one or more embodiments, the user modes may only affect the animation timeline playback functionality and otherwise rely on the same or similar animated parameter values used to determine the travel path and/or camera path.

What is meant by "environment" as used in one or more embodiments described herein is a pre-filmed real-world scene that was filmed with a specially equipped camera whose position, orientation, and inertia data (9Dof+GPS) is recorded at the same time as the corresponding video footage was.

What is meant by "travel path" as used in one or more embodiments described herein is the calculated or animated path that user(s) will follow as they are filmed travelling through the virtual or real-world environment in which the user(s) has been digitally inserted.

What is meant by "camera path" as used in one more embodiments described herein is the calculated or animated path the camera follows through the scene as it films the traveling user(s) and environment. The camera path includes translation and rotation parameters and any additional camera specific parameters (e.g., field of view, look at object), all of which can be animated on the timeline using keyframes.

By way of non-limiting example, in one or more embodiments, the animation timeline is a custom animation timeline that with a cue sequencing system provides a programmer the ability to add an animated virtual user, or an avatar ("AV") into the environment to help with programming. For example, various styles of generic 3D sketch-style figures may be selected as the AV's identity/appearance. The AV may have static height and stride parameters that can be set to match those of the human user. The stride parameter for example is the average distance that the real-world user averages per each step.

Matching AV's height and stride distance to that of the human user will ensure that the real-world film shot appears nearly identical to what is seen when a cue is played back with an AV instead of a human user. In one or more embodiments, the AV is a rigged 3D character whose skeleton is linked as a kinematic chain. The AV may do nothing except an automatic walk, automatic jog, or automatic run along the travel path of the cue being played back. For example, an automatic walk, automatic jog, or automatic run may be selected as the seamless kinematic loop data to play back based on the AV's speed. In one such embodiment, the AV's speed is equal to the treadmill speed and the human user's speed is equal to the treadmill speed. These values are equal as the values are based on real world speed and are synchronized. The AV may be a digital twin of the user by means of a multi-camera photogrammetry rig capturing an image of the user from multiple different points of view/locations at the exact same time, for the purpose of then using photogrammetry software to create the digital twin which can be rigged with a kinematic chain of bones, allowing the digital twin to be placed into the 3D environment and animated.

When a cue is played back that changes AV's position the AV will automatically walk along the calculated or animated travel path at a speed/rate that is calculated based on AV's stride parameter whose value was set to match the distance of one average footstep of human user. For example, one seamless loop of kinematic walking data results in one full gait cycle which is exactly two steps.

The AV is able to be viewed as 1st person, 3rd person, or a custom view by the system programmer while walking along the travel path.

A 3D-AV may be represented in the system as a 3D modeled character that is inserted into the 3D virtual space via the real-time render engine or the media server 3D space. The 3D-AV may then be affected by things like lighting, shadows, and object occlusion that are part of the 3D scene. The system may also provide the ability to overlay a 2D rendered composite image of the 3D-AV character which will match orientation, position, and scale.

In one or more embodiments, the animation timeline in combination with cue modes, hereinafter referred to as the system controller, may be a source of all control, movement, functionality, and/or operation of the motorized rotatable treadmill assembly as well as one or more cameras for capturing user movement on the assembly. This system allows for isolating user(s) from a background to be digitally inserted into a rendered 3D virtual scene or a pre-filmed real-world environment for the purpose of being filmed as the user is able to travel through the environment along the 2d ground plane an infinite distance in any direction The assemblies and systems described herein enable a user to travel an unlimited amount of distance through a virtual scene, all while the user remains within a perimeter defined by belt surface or essentially while remaining in one place (on top of the motorized treadmill). The user walks on the endless belt, the speed and/or direction of travel, of which is precisely controlled by data received from a media server, a pre-selected speed, or a rendering engine that is controlling the virtual scene. In embodiments where the motorized treadmill is used to render or generate content for a digital scene, a corresponding camera(s) movement through the scene can be precisely synched with the user's real-world speed and distance as they travel on the endless belt. This creates the illusion of movement of the user being filmed and the camera appear to travel through the scene but are in fact static in position or location. This can be combined with the additional element of controlling the direction the user is facing as they are traveling through the scene allows for an infinitely large virtual environment for a user to explore.

The devices and systems described herein allow, for example, a small studio to no longer be confined by a limited amount of physical space, or the immense costs associated with creating a larger film set. Benefits further include the ability to rotate the camera responsible for rendering/filming the scene (which acts as the background) precisely in sync with the person being inserted into the scenes to allow the studio or independent content creator the ability to film 360+ degree orbiting scenes around a person, which would otherwise be very expensive and highly technical to carry out using the methods of the prior art. The devices and systems described herein result in the incalculable savings of time by allowing filmmakers to obtain the same film footage and final result with fewer takes and allows a studio more opportunities to film shots on location without needing the actor or actress to be present.

The device and systems described herein allow a user and film camera to remain static relative to their real-world position while creating the illusion that both are able to move freely through a video-based environment.

As described in further detail below, in one embodiment, the illusion of orbiting the film camera around the focal point of the shot, which would be the user, may be created by instead rotating the person being filmed in synch with the orbital rotation speed and angle of the camera responsible for filming or rendering the video environment the user is being inserted into. For example, a camera moves in a circular 270 degree counter clockwise pathway around a vertical axis as the user on the motorized treadmill would also concurrently be rotated 270 degrees in the opposite direction (clockwise) at the exact same rotation speed as the camera.

The system may use forward and/or inverse kinematics to solve for speed, position, rotation, velocity and other parameters. The camera may rotate around a vertical axis positioned anywhere along a two-dimensional ground plane on the environment and is not limited to being centered on the assembly or the user. Movement of the camera and its rotation, pitch/yaw/roll may be whatever the camera operator chooses. For example, in one embodiment, I'm pretty sure that the orientation values of both the user and camera relative to one another as they travel through the environment may also use 'forward kinematic' equations to determine their value in certain instances.

Further, the illusion of movement of the user through the scene may be created by the user being filmed walking on the treadmill belt at a rate of speed that matches that of the scene camera as the camera moves along a one-dimensional path (vector).

In some embodiments, the orbiting movement and vector movement can be combined. Combining the travel of the treadmill belt with the rotational direction (heading) of the turntable the treadmill is mounted to create the illusion of unlimited movement along the two-dimensional ground plane of the video-based environment.

The embodiments illustrated herein show a single user on the motorized treadmill for ease of illustration. It is contemplated and within the scope of this disclosure that the motorized treadmill may have larger dimensions of one or more components to allow for creating the illusion of movement of multiple users. For example, the size of the belt and the turntable may be increased to accommodate two, three, or more users concurrently or in series. Additional belts may be used to enable supporting and creating the illusion of movement of multiple users concurrently in synch or independently. As such, the embodiments described herein are not limited by sizes or dimensions disclosed in the examples. The embodiments of the system comprising the motorized treadmill are not limited to those described herein. The motorized treadmill has applications outside of the digital environments described herein. It is also contemplated and within the scope of this disclosure that the motorized treadmill may be provided on its own and/or for use in combination with virtual reality systems, headsets, and games/environments accessible via virtual reality systems or within the metaverse.

The motorized treadmill is one independent element of the present disclosure. In one or more embodiments described herein, the motorized treadmill is configured to provide both linear movement and rotational movement planes for a user. The motorized treadmill in general comprises a floor base supporting a turntable and travel deck. The floor base houses components for powering the rotational movement of the turntable. The turntable supports the travel deck, which comprises an endless rotating belt or treadmill. Together, the motorized treadmill thus allows for forward and reverse linear movement by way of the rotating belt and the turntable is endlessly rotatable to rotate the travel deck concurrently with rotation of the belt in the forward or reverse directions. Additionally, an angle or incline of the travel deck can be adjusted. These movements and positioning can be carried out concurrently and operated independently. The motorized treadmill thus allows for combinations of movement to support a user thereon.

For example, the floor base houses a motor, drive belt and roller and drive wheel assembly for operation of the turntable and travel deck. In another example, one or more electric motors may be provided and directly attached to a roller wheel as a single, compact assembly in the floor base for operating the turntable and/or belt. Additional mechanisms for operating the turntable include but are not limited to gear assemblies, thrust bearings or other bearings, or roller wheel(s) attached directly to motor shaft(s). A slip ring is used to rotate the turntable without cords. The cordless rotation of the turntable allows for infinite rotation of the travel deck such that rotation in one direction can exceed 360 degrees without requiring a change in direction or re-set operation.

A further embodiment may include rollers which drive the rotation of the turntable rotation contained within or on the floor base. Rather than the turntable sitting on top of rollers held within the floor base, the turntable contains the rollers needed to drive and support itself. The floor base then contains the track on which the rollers rest.

In one or more embodiments according to the descriptions herein, the turntable may also function with removal of the endless belt of the travel deck, and/or with a cover panel such that a top surface of the turntable is also a user support surface that is selectively rotatable. For example, the turntable of such an embodiment may have dimensions including a diameter in the range of 6-8 feet or more for real-world or virtually enhanced entertainment. A correspondingly large slip ring is included in the turntable, which would allow a real-world entertainer, for example, a DJ act, entertainer, or musician, to utilize power from the turntable and other audio, video, and data connections available to plug such devices into the turntable of this embodiment. As such, the turntable can be used in additional settings and enable DJs, for example, to play a live set where the DJ is rotated in combination with the camera described in one or more embodiments herein. This setup can create the illusion of movement wherein the camera is orbiting around and/or behind the DJ on the turntable and where the DJ and camera are able to view the crowd.

The motorized rotatable treadmill floor base and housing is constructed in a manner allowing for easy assembly/ disassembly and with various removable cover plates which allow for selected and easy access to the interior components of the turntable and floor base. The travel deck is also separable from the turntable and the turntable can be lifted from the floor base by way of handles which allow for ease of set up/take down but also for service and/or replacement of one or more parts. The handles may be removably secured to the frame of the travel deck for easy assembly and disassembly.

The floor base may also be adjustable itself by way of one or more adjustable height feet and wheels which allow for movement of the assembled device.

The motorized rotatable treadmill assembly can be incorporated into various environments and can further be used in virtual reality systems to enhance user experience with movement in various virtual environments. Controllers for the system can be operated by various types of software for endless end use of the devices.

In one or more embodiments described herein, the creation of the illusion of movement of an otherwise stationary user utilizes a control system for synching the operation of the treadmill, the position of the user, and the camera. An artificial intelligence (AI) system and/or existing software may be used to acquire the data needed to control the system, where the AI and/or existing software is able to analyze a video and determine very accurately the path, rotation, and/or 3D positional data of the camera that recorded the video. Currently available software and technology in the field of photogrammetry is rapidly expanding. Such software and related technology may also be incorporated into a control system for calculating the position of a video camera relative to the physical and real-world environment in an analyzed video clip.

In the embodiment illustrated in the figures, for example as shown in FIGS. 1-5, 3, a motorized rotatable treadmill assembly 10 comprises a travel deck 12 and turntable 40 which may be supported on a floor base 60. The travel deck 12 comprises an endless rotating belt system 16 for linear travel in forward and reverse directions. The travel deck is incorporated into and/or supported on the turntable 40, which allows for 360+ degree rotation thereof and thus of the travel deck 12. Together, the turntable 40 and travel deck 12 allow for omnidirectional virtual movement as a user can move in endless directions by combination of the linear and rotational movement provided by the motorized treadmill assembly 10. The travel deck 12 may also be elevated and/or inclined at one or both ends to provide for uphill or downhill movement for example. The linear and rotational movement as well as incline capability may be rendered concurrently and independently such that various directional and terrain style walking or running can be achieved.

Figure 13:
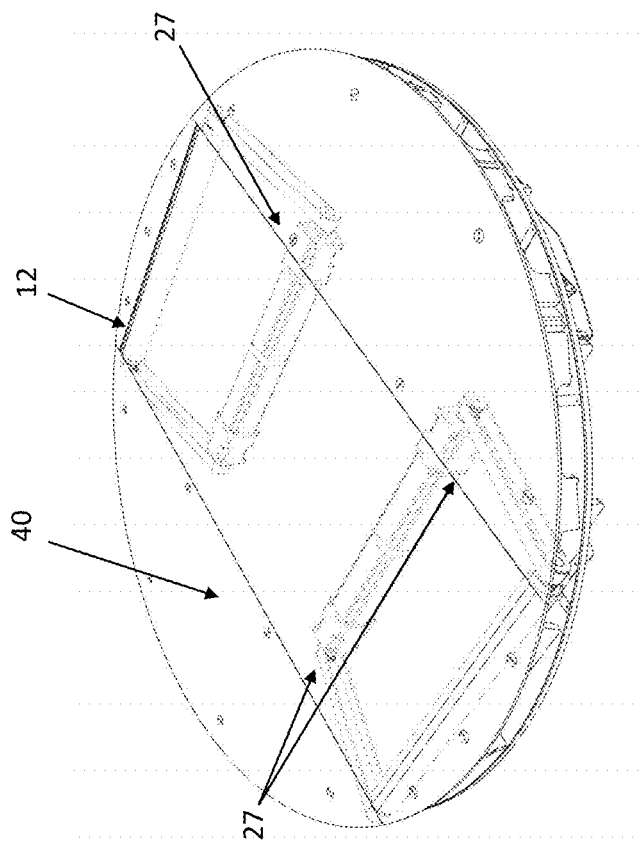
Figure 12:
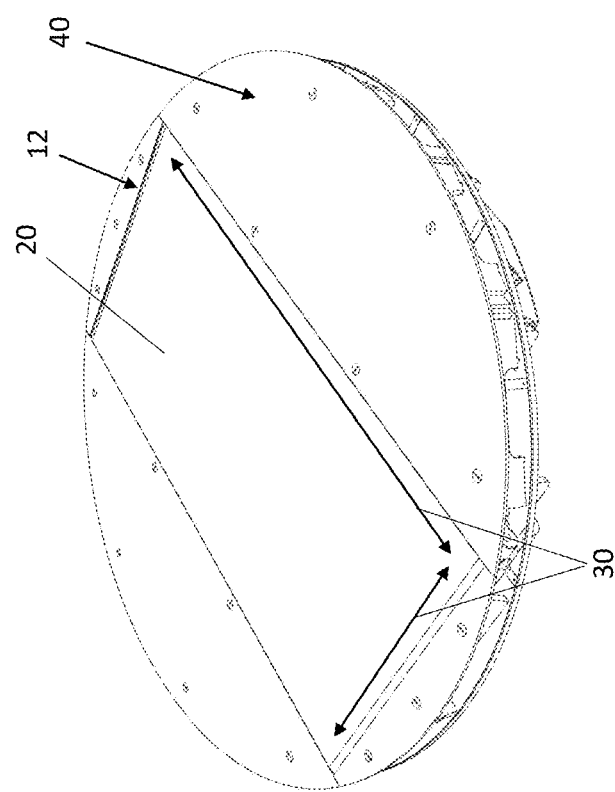
Figure 15:
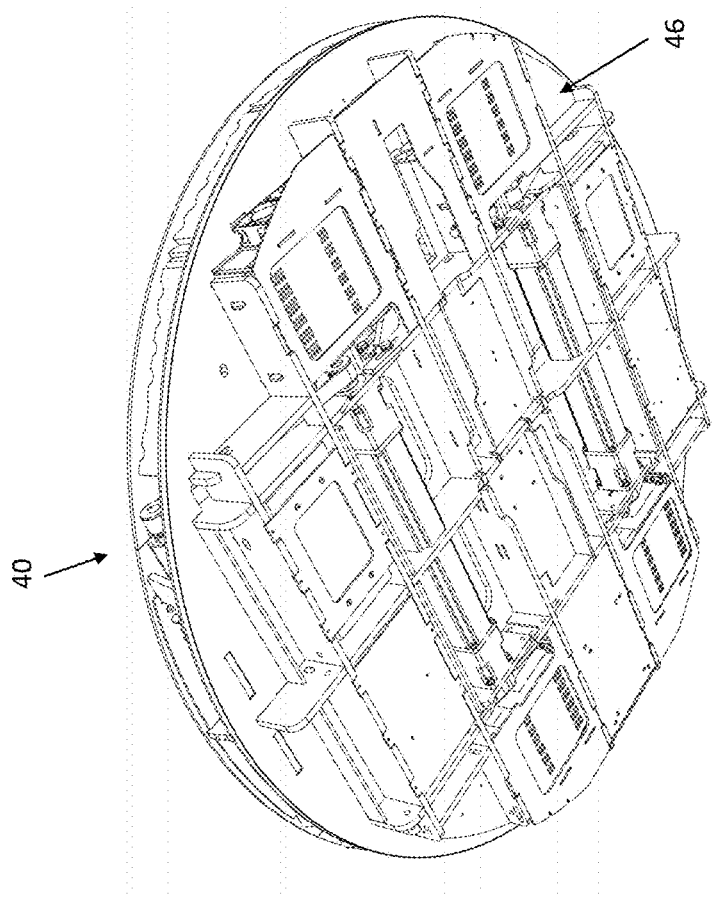
FIG. 15 is a bottom view of the turntable component.
Figure 14:
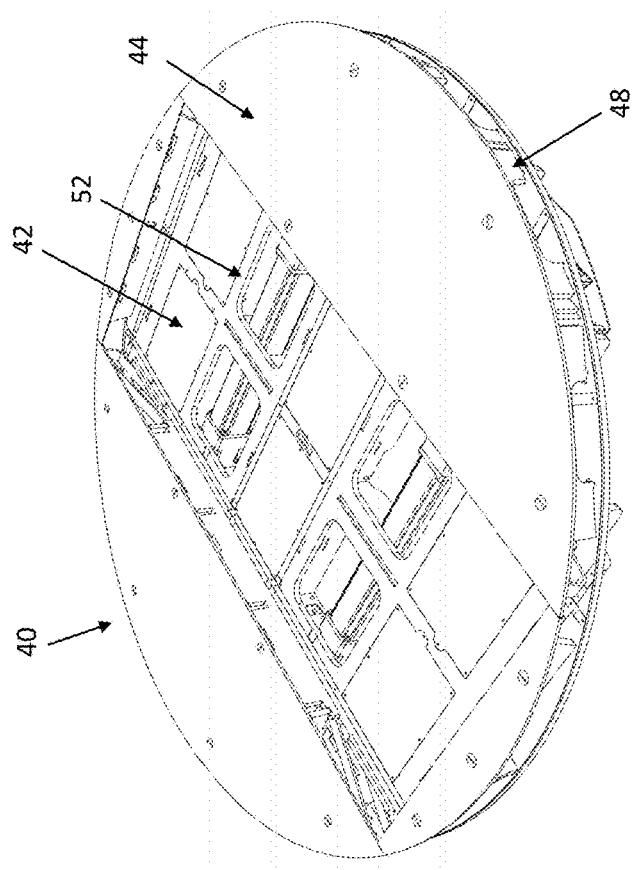
FIG. 14 is a perspective view of the turntable component with the travel deck removed therefrom.
Figure 16:
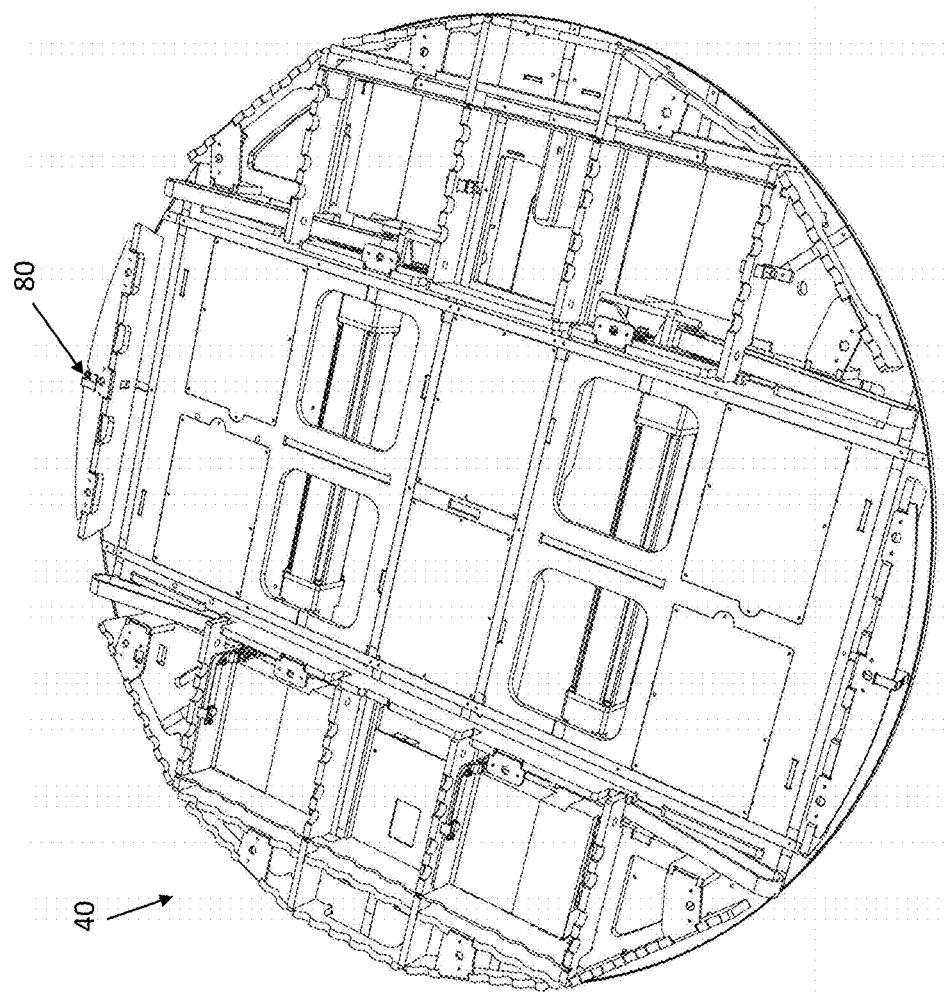
FIG. 16 is a top view perspective view of the turntable with cover panels removed for illustrating the internal components of the turntable.
Figure 18:
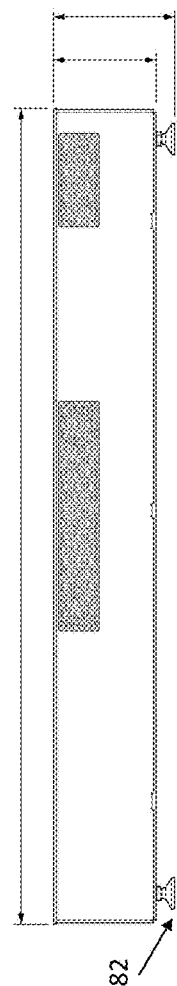
FIG. 18 is a side view of the floor base.
Figure 17:
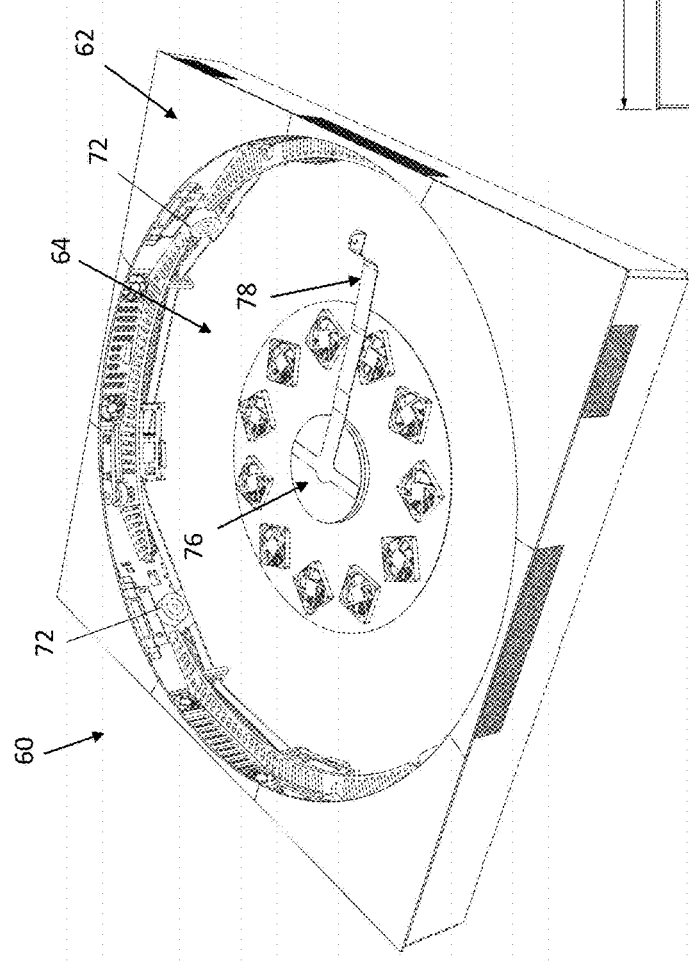
FIG. 17 is a perspective view of a floor base of the motorized rotatable treadmill according to one or more embodiments and with the travel deck and turntable removed.
Figure 19:
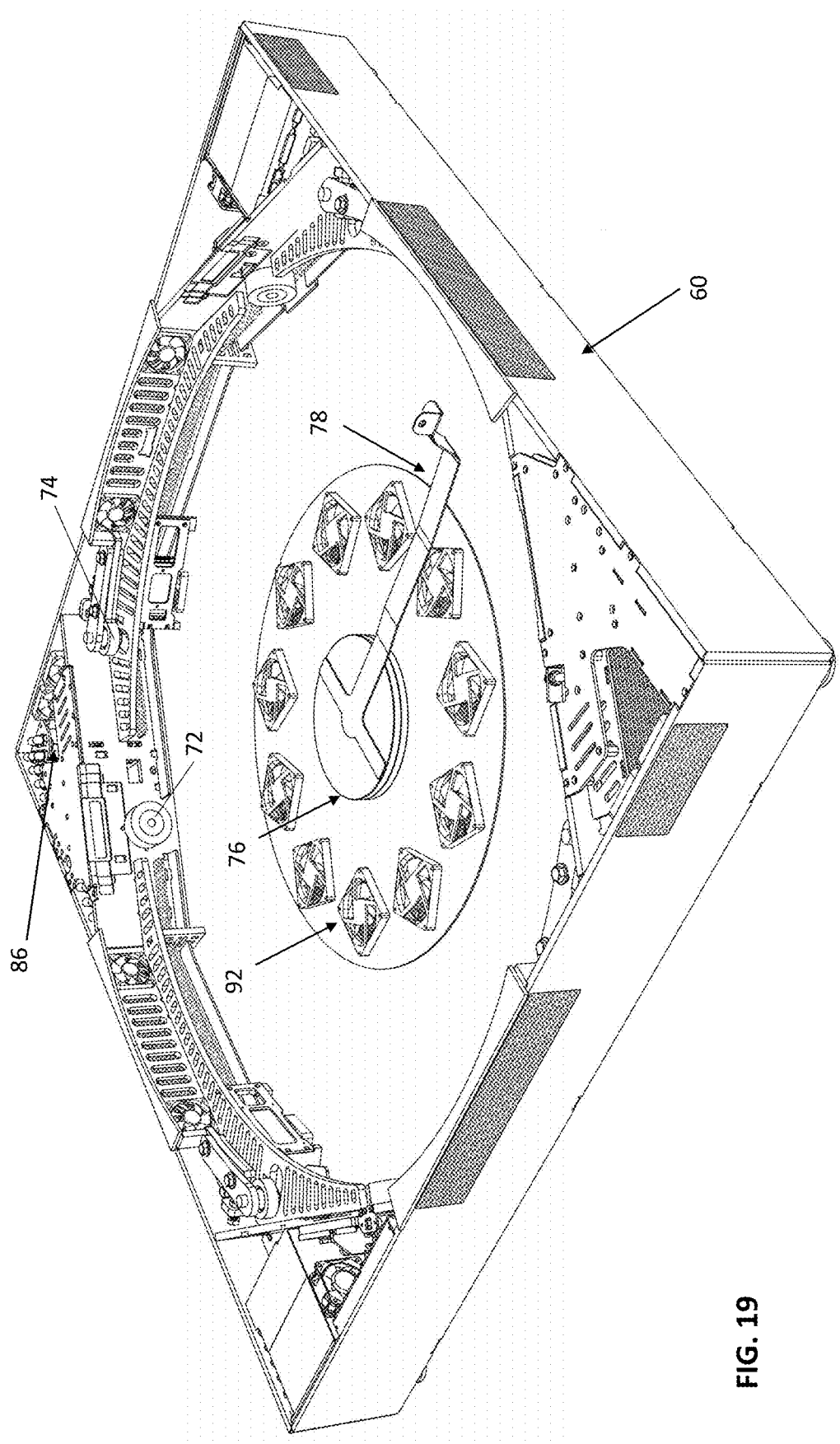
FIG. 19 is a top perspective view of the floor base with one or more cover panels removed to illustrate interior components of the floor base.

The travel deck 12 is illustrated in further detail in FIGS. 6-10. In the embodiment illustrated, the travel deck 12 has a frame 18 which supports the rotating belt system 16. The rotating belt system 16 comprises a belt 20 that is operably provided around belt pulley 22 and frame 18 for supporting the user thereon. The belt 20 may be a rubber treadmill belt and the pulley 22 may be toothed belt pulleys for rotating the belt 20 therearound. The frame 18 may be a metal frame, such as an aluminum or steel support frame 18. In further detail, the treadmill belt 20 may be powered by a system of servo motors 27 positioned below or next to the treadmill belt 20. As shown in FIG. 13 for example, four servo motors are provided, and each motor shaft mates with an inline planetary gear. An output shaft of each planetary gear has a tooth keyed belt pulley 22 fastened to it as does each side of front and rear belt roller shafts 23. Torque is then transferred through timing belts such that it is possible to drive all four available drive points (both sides of each belt roller) or two drive points in the alternative.

The frame 18 may further be provided with one or more handles along one or more sides. The handles may be pivotable and/or removably connectable to the frame 18 to allow for lifting and lowering of the travel deck 12 out of and/or into connection with the turntable 40.

Figure 10:
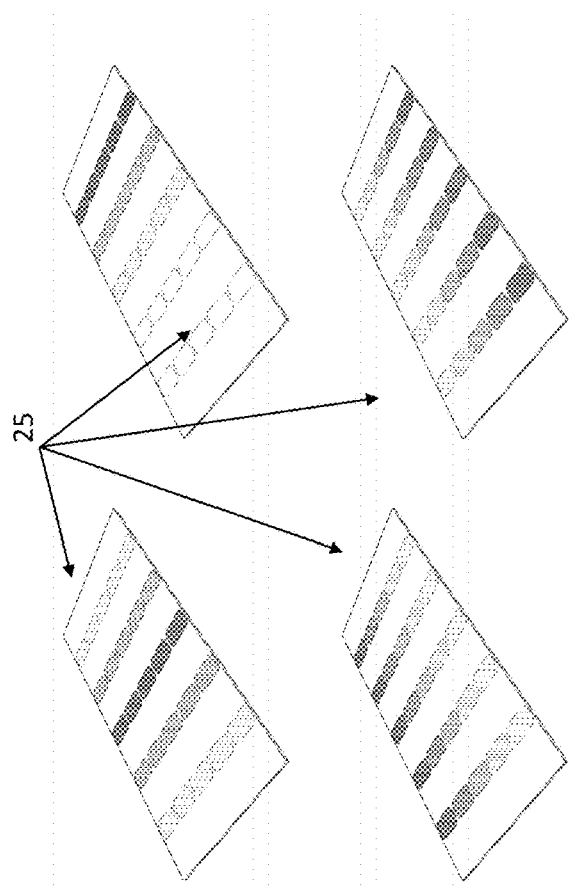

In the embodiment illustrated, the travel deck 12 further comprises one or more vibration motors 24 which can be used, for example, to provide haptic feedback 25 to a user or provide cues or warnings to the user as shown in FIG. 10. The vibration motors 24 may be provided in an array where individual motors are spaced apart across an underside of the belt 20 and the motors independently operably to provide targeted vibration to one or more locations on the belt 20. A substrate 26 is provided for supporting the vibration motors 24 and/or transferring the vibration to the belt 20.

For example, the substrate 28 may be a phenolic resin sheet that acts as the belt deck that the belt 20 will slide across as it moves and is mounted to a metal substrate 26 such as an aluminum sheet. A tape such as 3M VHB tape may be used to secure the vibration motors between the aluminum sheet 26 and the substrate 28 and may also act as a cushion for the vibration motors 24 as the motors 24 are secured to the underside of the substrate 28.

It is further contemplated that the travel deck 12 is removable from the turntable 40 as the travel deck 12 is secured therewith with fasteners such as nuts and bolts. Thus, the travel deck 12 is easily removable for belt 20 changes and servicing.

The travel deck 12 provides a user "travel area" 30 that may be defined by the size of the belt 20 of the rotating belt system 16. In one embodiment, the travel area 30 is approximately 39.5"×19.5", however, the size of the travel area 30 may be increased or decreased without deviating from the scope of this disclosure. The belt 20 may be a treadmill belt which travels approximately 85.4" for each revolution and is 19.7" wide. One revolution of the belt pulley along with the belt roller causes the belt to travel 6.19", a system of motors able to deliver 1500 rpm with sufficient torque to the belt pulleys will allow a user to reach a running speed of 8.79 mph.

Figure 11:
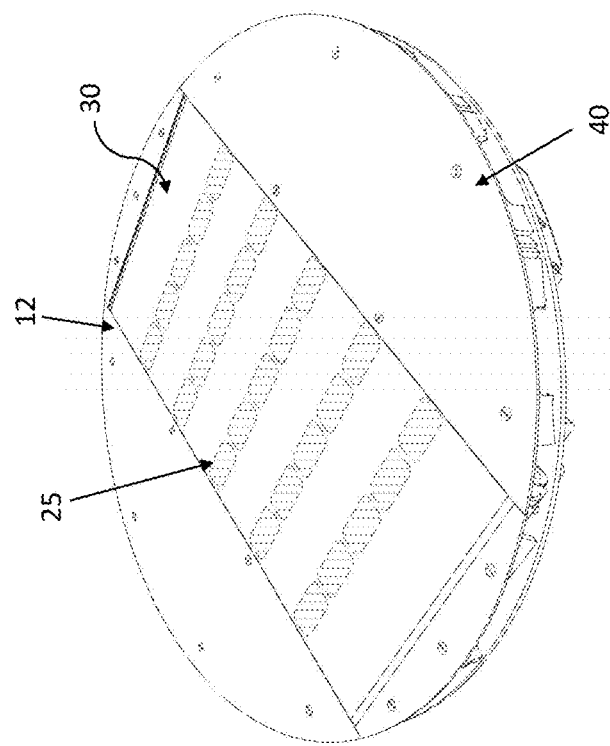
FIGS. 11-13 illustrate a turntable component of the assembly according to one embodiment.

As noted above, the motorized rotatable treadmill assembly 10 may also include vibration motors 24 such that a system with the treadmill assembly 10 may utilize a haptic feedback system of the travel deck 12 as illustrated in further detail in FIGS. 10-11. For example, a grid of vibration motors 24 is mounted underneath the treadmill belt 20. This allows a control system in connection with the motorized rotatable treadmill assembly 10 to signal the user thereon with various messages via haptic feedback. Examples of haptic feedback messages include but are not limited to an indication that the belt 20 is going to start or stop moving, an indication that the turntable 40 is going to start or stop rotation, or an indication that the user's feet are nearing edges of the belt 20. Vibratory signals as indicated in FIGS. 10-11 may also be sent to let the user know where they are positioned as the user walks on the belt 20 so the user does not need to look down at the belt 20. The motors 24 may also be pulsed to let the user know to move to another location (e.g., move right or move left to avoid walking off the belt).

The turntable 40 is illustrated in further detail in FIGS. 12-16. The turntable 40 comprises a space 42 for supporting the travel deck 12 therein. The turntable housing comprising an upper plate 44 that may support a removable cover which may be comprised of one or more cover pieces. The turntable 40 housing also includes a base plate 46. Side supports 48 provide structural framework support to the turntable 40. One or more side supports may be configured to provide handles for lifting the turntable 40. The turntable 40 also comprises a base 50 which, in one embodiment, may sit atop a plurality of roller wheels which retain the turntable 40 centered within the floor base 60. Additional side roller wheels 54 may also be provided for rotation of the turntable 40. Roller wheels are illustrated however, alternative or additional mechanisms can include bearings, or for example, thrust bearings. The turntable 40 rotation may be powered by one or more motors 56, for example, two motors as discussed in further detail below with respect to the base 60.

As illustrated, the turntable 40 and housing 44 are overall circular in shape which enables the clean and endless rotation of the turntable 40.

An interior frame 52 of the turntable 40 is configured to receive the travel deck 12 within the space 42 for the travel deck and additionally, the frame 52 supports one or more motors for coupling to the travel deck 12 belt system 16 for rotation of the belt 20. Thus, the power source for the travel deck 12 may be provided within the turntable 40 and the travel deck 12 removably and operably coupled thereto. The turntable 40 frame 52 may be comprised of aluminum or a like material such that when the cover 46 is provided thereon a user's weight can be supported on both the travel deck 12 and on the surfaces provided by the cover 46.

The turntable 40 is then operably and removably couplable to the floor base 60. The floor base 60 is illustrated in further detail in FIGS. 17-23. As mentioned above, the turntable 40 may be provided in combination with the floor base 60 which further comprises a removable top cover 62, side supports 64 and the base housing 60. The floor base 60 comprises an opening 64 for operably receiving the turntable 40 therein. The removable top cover 62 provides an optional floor 66 for use when the cover 62 is installed over the travel deck 12. The cover 62 may be constructed of a metal such as aluminum.

Figure 20:
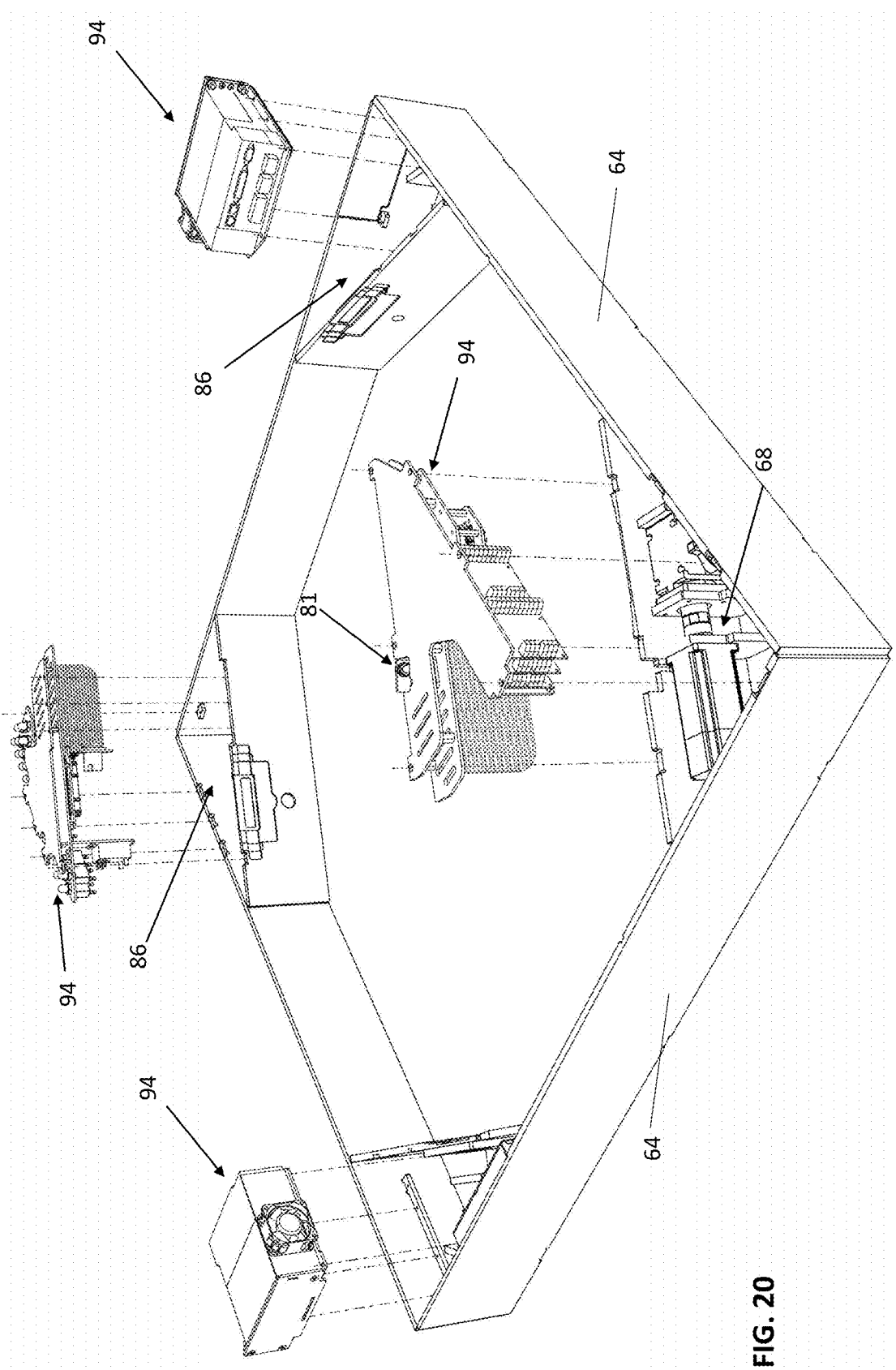
FIGS. 20, 21, and 22 illustrate power components for turntable and travel deck supported in the floor base.
Figure 22:
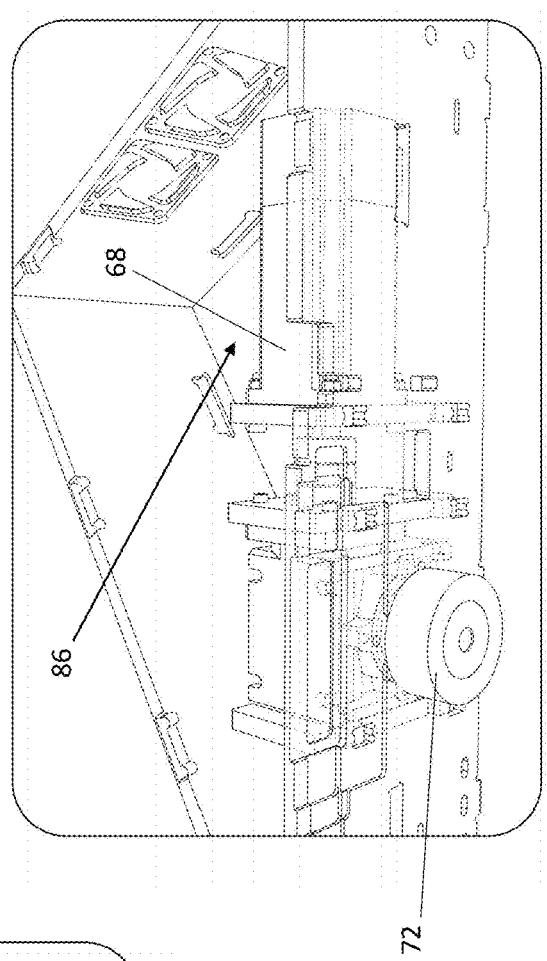
Figure 21:
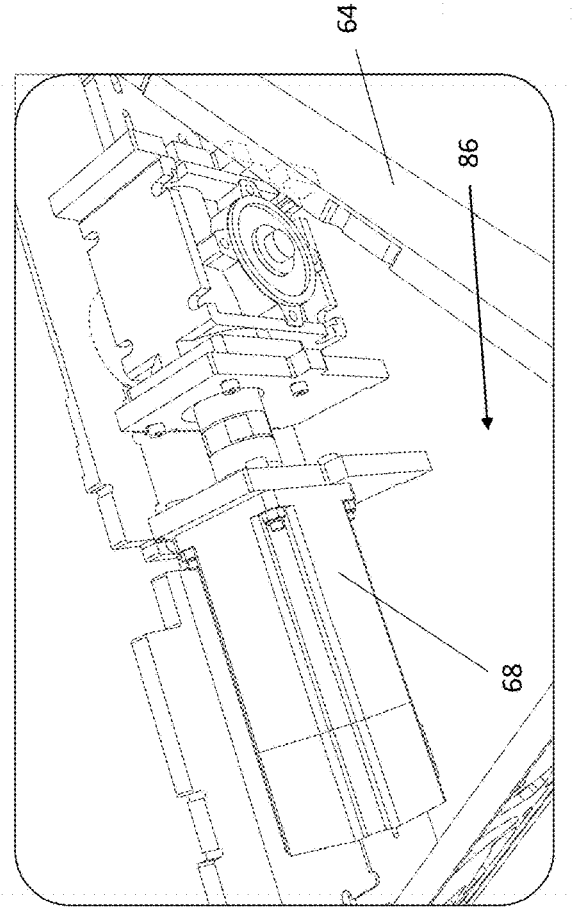
Figure 23:
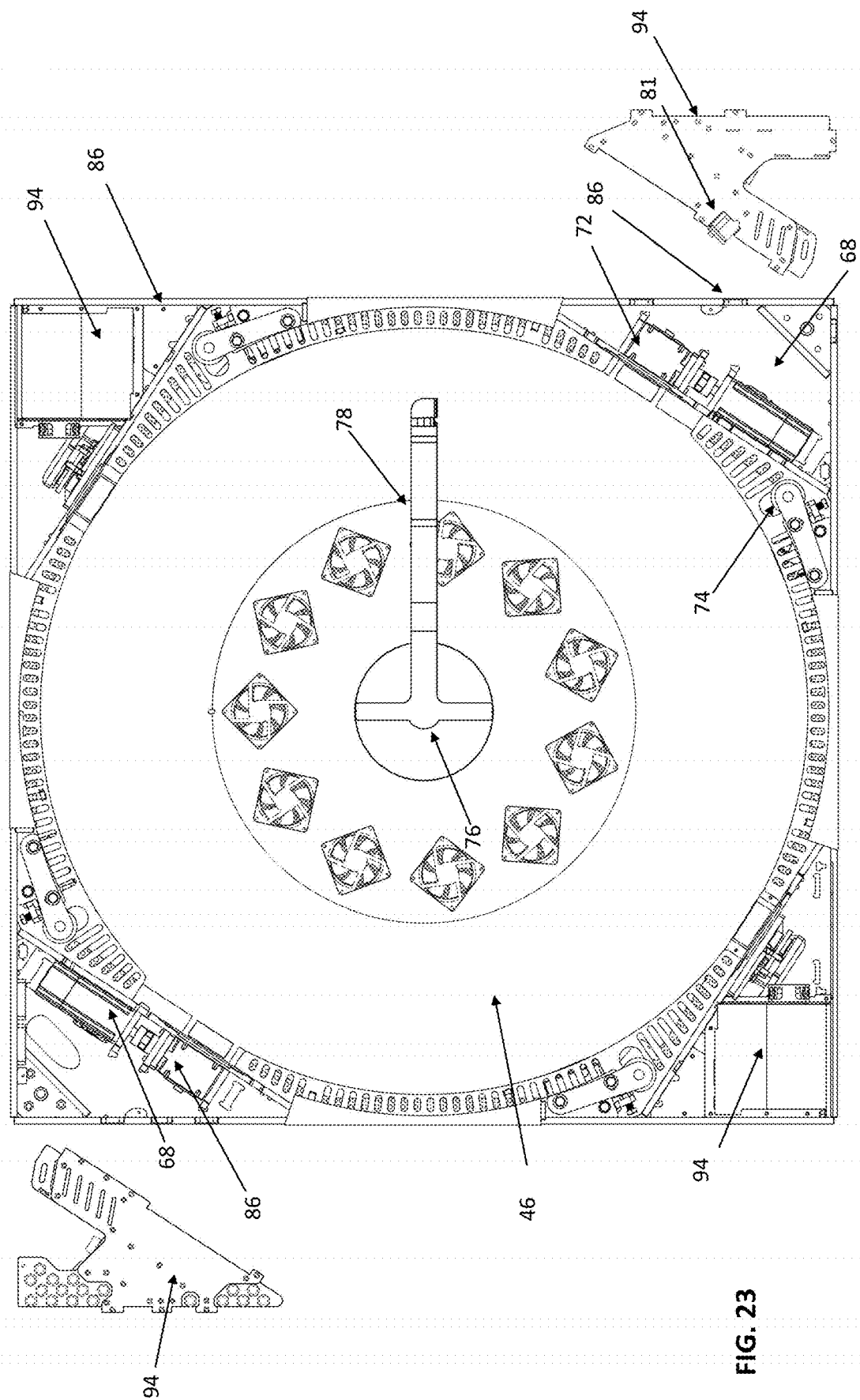
FIG. 23 is a top view of the floor base illustrating the parts of the floor base.

As shown in FIGS. 20-22, the floor base 60 holds assemblies 68 which transfer power from an associated motor, such as a servo motor provided in operable connection with a drive belt to transfer rotational power to a roller or drive wheel 72 which supports the turntable 40 thereon and enables rotation of the turntable 40 with respect to the base 60. In one embodiment, a worm gear may be used for each rotation roller 72 which provides a compact assembly for the 90-degree rotation of an output shaft and allows for a servo motor to be installed in the compact space 86 available in corners of the floor base 60. An additional side roller 74 may also be provided in this assembly to center the turntable 40 in combination with rotation of the turntable 40.

The base 60 also operably supports a slip ring 76 and arm 78 for transferring power and data to the turntable 40 for rotation and allowing for infinite and cordless rotation of the turntable 40. The arm 78 couples to the bottom of the turntable 40 and as the turntable rotates the rotation is transferred to the arm and thus rotates the slip ring 76.

A main power input and one or more fan controllers are provided in an assembly 94 that may fit in the corner space 86 of the floor base 60. For example, a male and female 24 pin industrial connector with a 20a/480v rating for each of the 24 contacts is provided. The assemblies 94 are placed or positioned in a respective corner space 86 and then may be fastened into place with fastener such as a screw. When the assemblies 94 are pushed down into place the male and female connectors automatically mate with one another connecting all of the circuits. This allows for ease of service for any of the electronic components. For example, if a breaker needs replacement components require re-wiring, or for initial component wiring, the assembly can be pulled out as a single piece and worked on apart from the main unit 10.

The floor base 60 may also be provided with one or more adjustable feet 82 and/or casters or wheels, allowing for height adjustment of the floor base 60 and thus turntable 40 and travel deck 12 and for ease or movement of the floor base 60 as needed.

One or more sensors, such as inductive proximity sensors, or hall sensors 80, 81 may be provided such that the control system for the motorized rotating treadmill assembly 10 is capable of setting a homing position for the turntable 40. For example, one side 80 of the hall sensor may be mounted on an outer edge of the turntable 40 and the other side 81 mounted inside of the floor base 60 at the same height and directed towards a center location of the base 60. One or more sensors 80, 81 may be included the base 60 and turntable 40 for allowing the assembly to home itself and establish an accurate start position for the rotational position of the turntable. The proximity sensor 80 unit itself may be mounted in the floor base 60 and then small neodymium magnets 81 that trigger the proximity sensor 80 are attached to the turntable 40.

In one or more embodiments, the motorized rotatable treadmill assembly 10 is constructed with frame work and mounting plates which allow for easy access, component swapping and serviceability without disassembly. For example, mounting plates for the driver boxes, which each control a single motor, allow for easy replacement or swapping of parts. Easy connection mechanisms, such as tabs on a portion of the turntable drive plate inserts can interlock with slots in the frame for easy and secure assembly. The assembly can be assembled, for example and the travel deck, turntable and base securely connected and fastened into place using a single fastener such as a bolt.

Moreover, the assembly 10 may be self-grounding by way of copper strips 90 provided along the bottom of the floor base 60 which is compressed against a copper strip sitting atop the mounting lip once fastened into place.

The motorized rotatable treadmill assembly 10 may have a plurality of intake and exhaust fans 92 for cooling of components. Each of the fans may be independently controllable for targeting a motor and/or driver, for example and configured for speed adjusted over a wired or wireless network connection. This allows for the fans to be run as low as possible (and thus as quietly as possible) and even completely turned off during selected times, such as during a film take. Once film take is complete the fans can be turned up very high to quickly cool down all of the components in the assembly 10 between takes.

In one or more embodiments wherein the motorized rotating treadmill assembly 10 is incorporated into an environment for creating the illusion of movement throughout a scene in combination with a virtual or digitally rendered, inserted or displayed background, at least top surfaces of the treadmill 10 including cover plates and the treadmill belt 20 may be painted a bright green color or other color such as bright blue frequently used in film production as a way to digitally isolate a person being filmed for digital insertion into a separate scene. Edges and vertical surfaces may be similarly painted.

Figure 25:
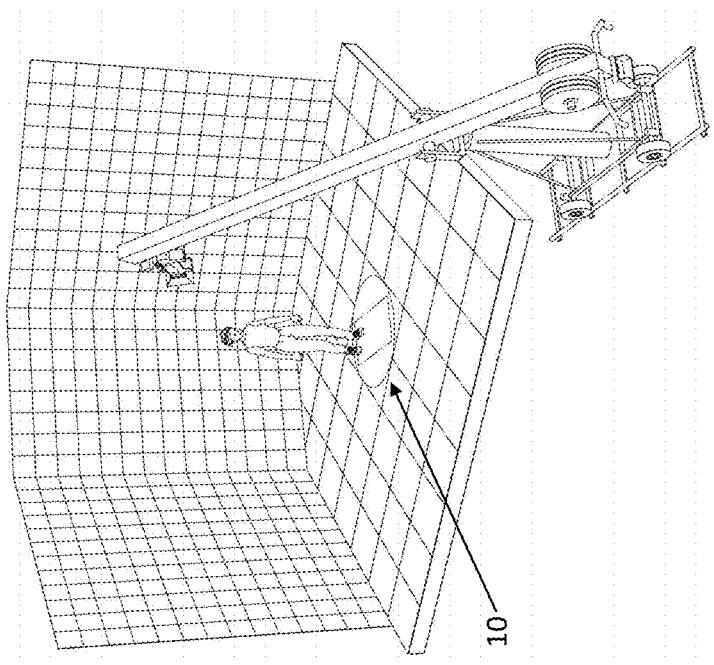
FIGS. 24 to 26 illustrate the system according to one or more embodiments herein including the motorized rotatable treadmill in various environments.
Figure 24:
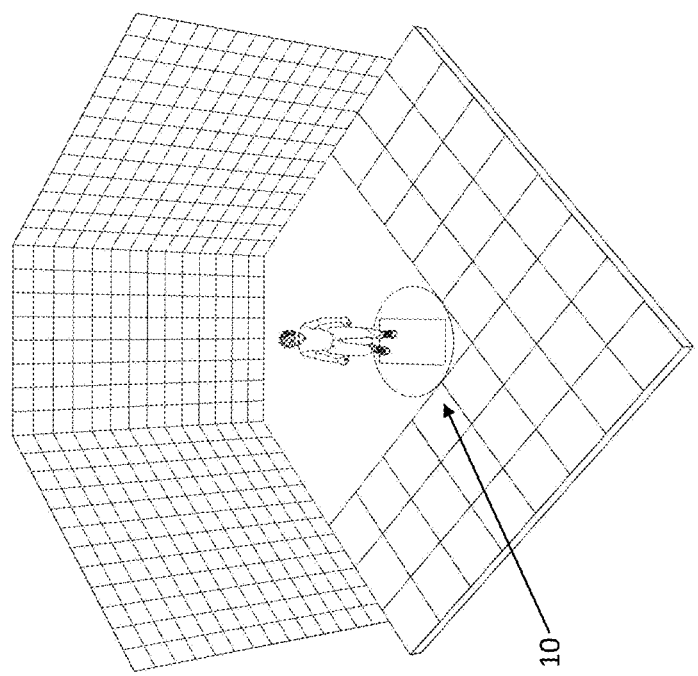
Figure 26:
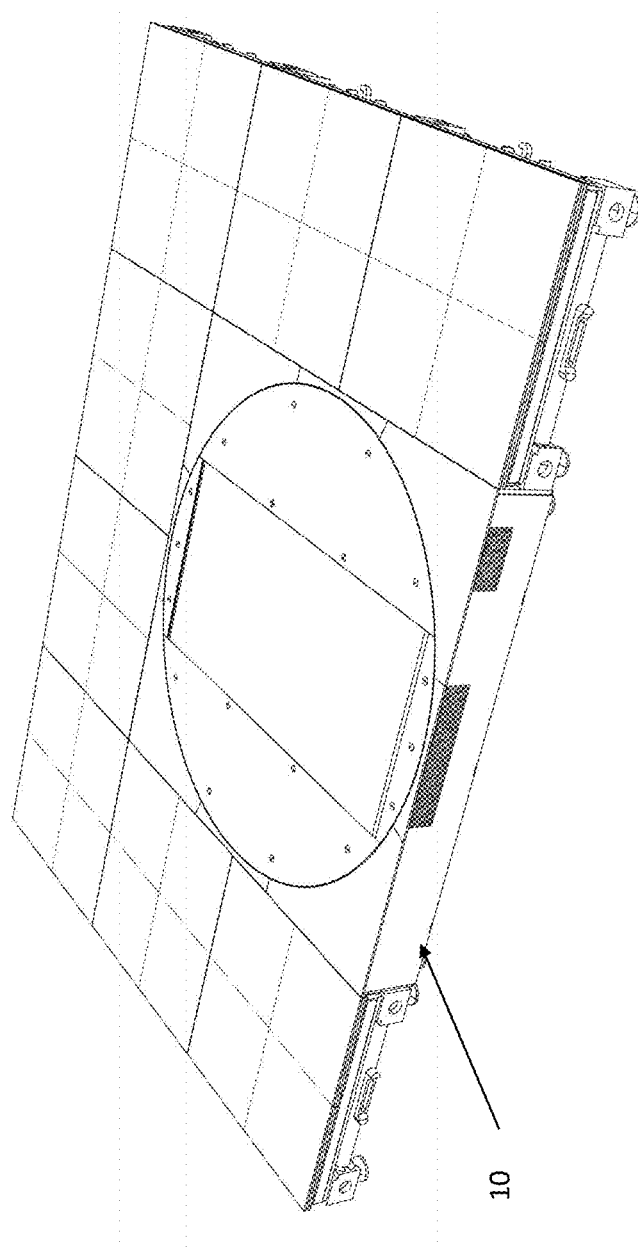
Figure 27:
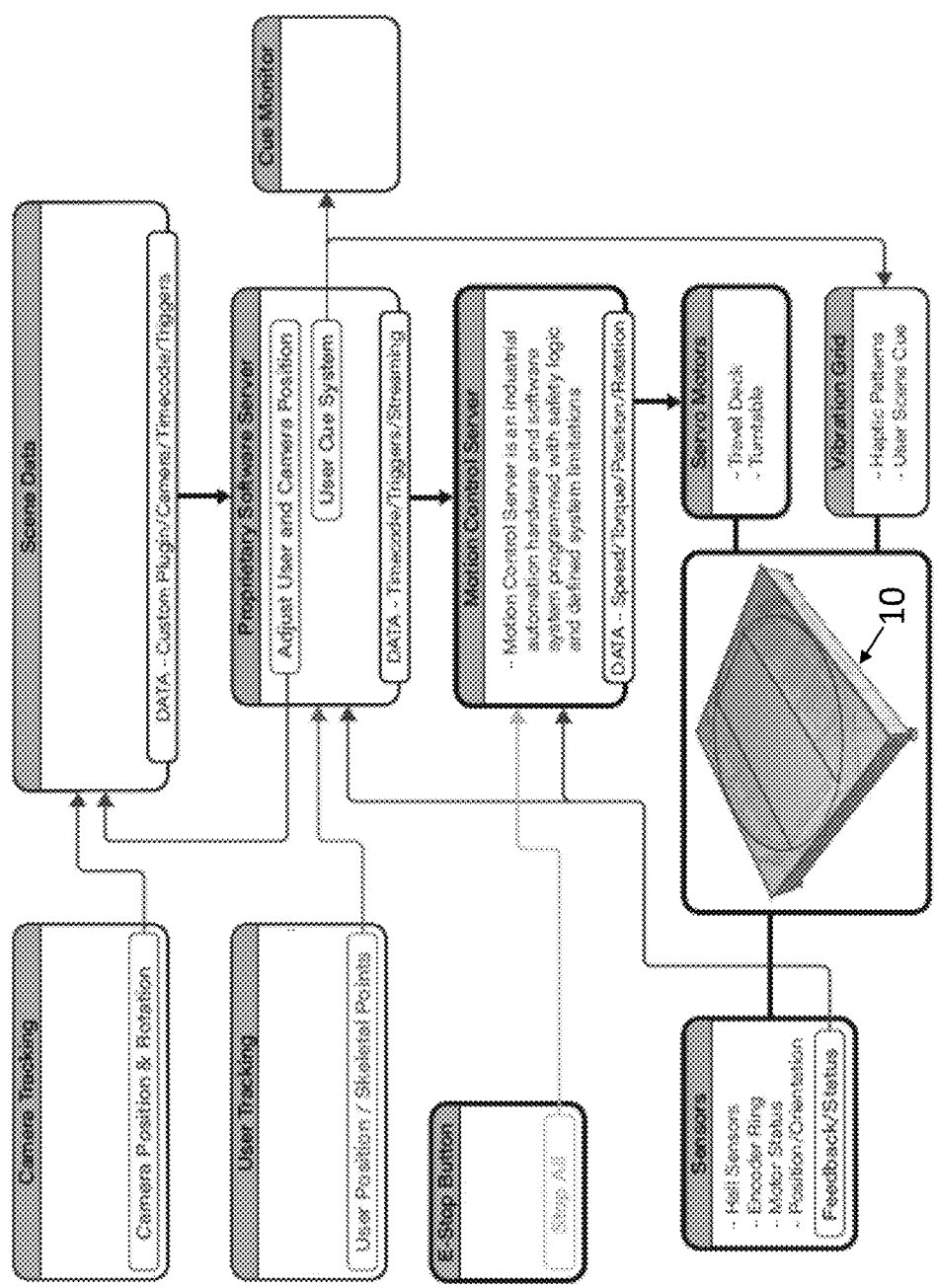
FIG. 27-28 are flow charts illustrating a method of communication and control of the assembly and system.
Figure 28:
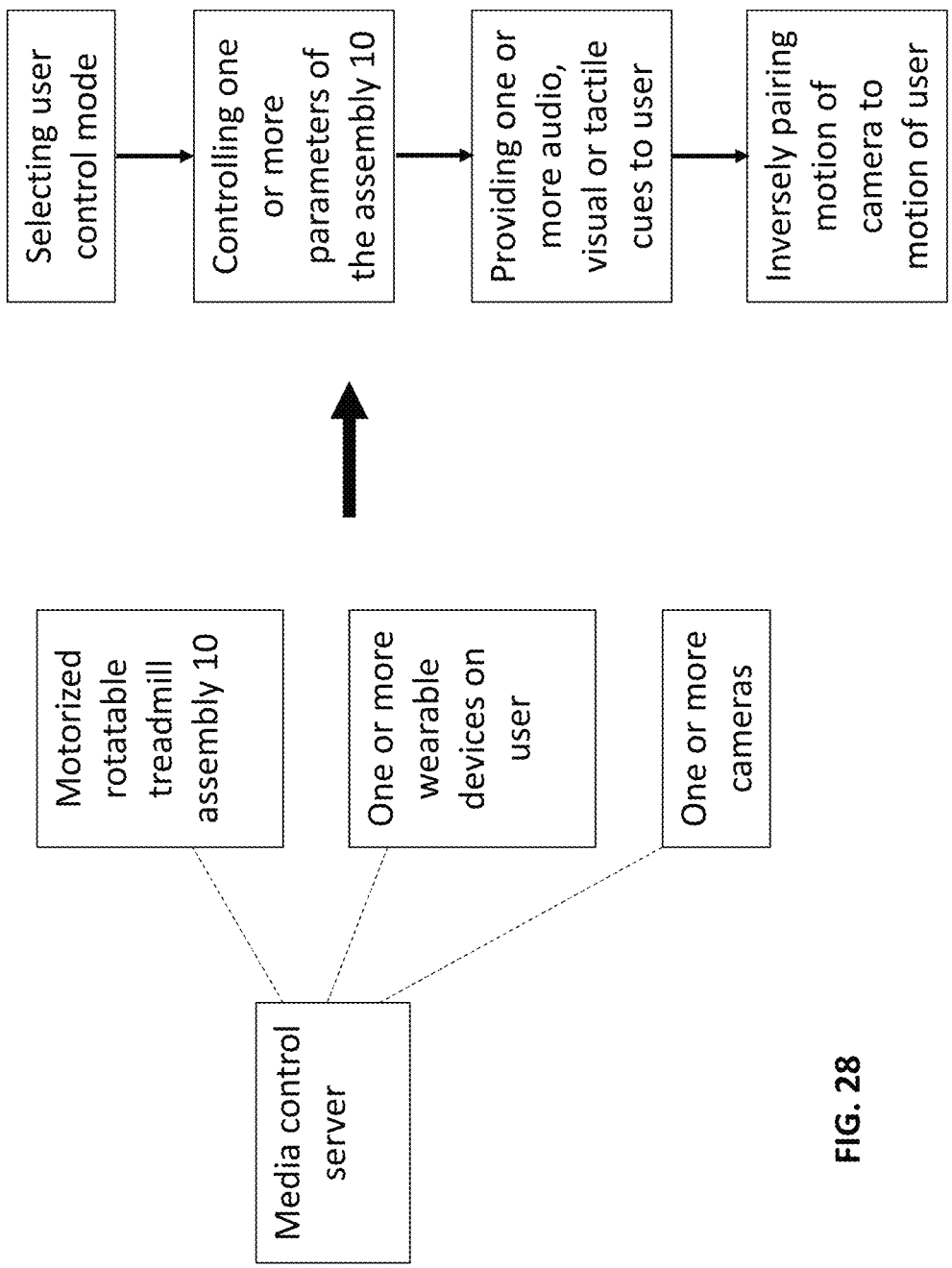

As illustrated in FIGS. 24-26, the motorized rotating treadmill 10 is also configured to fit into an existing LED floor tile system, for example, a system that uses 2'×2' tiles. In such a system, four of the preexisting LED tiles are removed and replaced with the motorized rotating treadmill 10. The feet on the bottom of the floor base 60 are independently adjustable to match the height of the LED floor tile system to provide a smooth and consistent surface and can be adjusted by removal of the top cover panel rather than requiring access to the sides or bottom of the treadmill 10. Thus, adjustment for height can easily be carried out even after the motorized rotatable treadmill 10 is inserted into the existing LED floor tile system or otherwise assembled in an environment.

It is also contemplated and within the scope of this disclosure that larger covers for the base 60 and/or turntable 40 can be provided. For example, when the motorized rotatable treadmill 10 is used with an LED floor system or other panel floor construction of larger tiles, for example, half meter tiles, a larger top cover for the floor base 60 is provided and which fills and covers the gaps between the base 60 and adjacent floor panels.

The motorized rotatable treadmill assembly according to one or more embodiments herein may be remotely controlled. The electric components in communication with a controller and/or software control system for remote operation and control of the operation of the motorized rotatable treadmill assembly. That is, control of the speed and direction of the treadmill belt, speed and direction of the rotation of the turntable, angle of the travel deck, control of fans, and combinations thereof can be remotely controlled and synched to various equipment and environments.

Although the present disclosure has been described with reference to preferred embodiments, workers skilled in the art will recognize that changes may be made in form and detail without departing from the spirit and scope of the disclosure.

The invention claimed is:

1. A system for creating the illusion of movement of a user, for use in virtually rendered settings, the system comprising:
   a motorized treadmill base having an endless belt operably supported on a rotatable turntable such that the treadmill allows for unlimited directional movement of the belt; and
   a controller configured to synch the movement of the treadmill with a camera in real-time, and
   wherein the treadmill base is configured to support the user thereon and wherein the treadmill base remains stationary, and the user movement is confined to a surface area of the belt, and the illusion of unrestricted movement is created.

2. The system of claim 1, wherein the camera and the user rotate inversely to one another.

3. The system of claim 2, wherein the camera movement is synched with a real-world speed and distance traveled by the belt for creating the illusion of unrestricted movement of the user.

4. A method of creating the illusion of movement comprising:
   providing an endless track on a rotatable turntable and a camera spaced apart from the turntable and wherein the camera is moveable around the turntable about an axis centered on the endless track;
   controlling the speed of the endless track;
   controlling the direction of the endless track by rotating the turntable;
   synching movement of the camera with a real-world speed of the endless track and a distance traveled by the track;
   providing one or more audio, visual, or tactile cue sources to the endless track, rotatable turntable, user or a combination thereof; and
   actuating one or more audio, visual, or tactile cue sources to provide a physical signal to the user on the endless track indicating one or more of a position of the user on the track, an initiation or ceasing of movement of the track, and an initiation or ceasing of rotation of the turntable, or a cue related to the scene being filmed.

5. The method of claim 4 and further comprising installing the rotatable turntable in an LED based virtual film set or green screen film set.

6. The method of claim 4 and further comprising:
   tracking the precise location of the user;
   providing physical cues to the user through to direct the user's movement to maintain the user on a location of the endless belt; and
   if the user deviates from the location on the endless belt, adjusting a location of the camera and environment to compensate for the deviation.

* * * * *